United States Patent [19]

Uchida

[11] 4,352,550

[45] Oct. 5, 1982

[54] COMBINATION OF CIRCULAR/STRAIGHT LINE LIGHT BEAM SCAN TRANSFORMING APPARATUS AND OPTICAL DEVICE AND METHOD OF FABRICATING CIRCULAR/STRAIGHT LINE TRANSFORMING DEVICE

[75] Inventor: Kozo Uchida, Akikawa, Japan

[73] Assignee: Iwatsu Electric Co., Ltd., Tokyo, Japan

[21] Appl. No.: 213,301

[22] Filed: Dec. 5, 1980

[30] Foreign Application Priority Data

| Dec. 13, 1979 | [JP] | Japan | 54-160831 |
| Dec. 13, 1979 | [JP] | Japan | 54-160832 |
| Dec. 13, 1979 | [JP] | Japan | 54-160833 |
| Dec. 13, 1979 | [JP] | Japan | 54-160834 |
| Dec. 13, 1979 | [JP] | Japan | 54-160835 |
| Dec. 13, 1979 | [JP] | Japan | 54-160836 |
| Dec. 13, 1979 | [JP] | Japan | 54-160837 |
| Dec. 13, 1979 | [JP] | Japan | 54-160838 |
| Dec. 13, 1979 | [JP] | Japan | 54-160839 |
| Dec. 13, 1979 | [JP] | Japan | 54-160840 |
| Dec. 13, 1979 | [JP] | Japan | 54-160841 |
| Dec. 13, 1979 | [JP] | Japan | 54-160842 |

[51] Int. Cl.$^3$ .................................................. G03G 15/00
[52] U.S. Cl. .................................................. 355/3 R; 355/1; 355/14 R; 318/301; 318/313; 350/96.20; 350/96.25; 350/96.24
[58] Field of Search ............... 355/3 R, 1; 350/96.1, 350/96.11, 96.20, 96.25, 96.24; 318/301, 313

[56] References Cited

U.S. PATENT DOCUMENTS

| 3,514,351 | 5/1970 | Mukai | 350/96.25 X |
| 3,666,347 | 5/1972 | Kitano et al. | 350/96.25 X |
| 3,902,880 | 9/1975 | Strack | 350/96.24 X |
| 3,912,362 | 10/1975 | Hudson | 350/96.20 |
| 3,977,764 | 8/1976 | d'Auria et al. | 350/96.25 X |
| 4,026,693 | 5/1977 | Sato | 350/96.25 X |
| 4,127,319 | 11/1978 | Forney, Jr. et al. | 350/96.2 |
| 4,141,642 | 2/1979 | Nagai et al. | 350/96.25 X |
| 4,154,500 | 5/1979 | Funato et al. | 350/96.25 |
| 4,170,400 | 10/1979 | Bach et al. | 350/96.25 |
| 4,222,630 | 9/1980 | Delignieres | 350/96.24 |

*Primary Examiner*—A. C. Prescott
*Attorney, Agent, or Firm*—Blakely, Sokoloff, Taylor & Zafman

[57] ABSTRACT

A combination of a circular/straight line light beam scan transforming apparatus and optical device constitutes an optical system. In the optical device, a light beam whose intensity is varied by a modulation signal is produced, and an object is exposed to the scanning beam from the light beam scan apparatus. The light beam scan apparatus includes a circular/straight line transforming optical fiber assemblage having a cylindrical portion and a linear portion. The cylindrical portion has a fore end part bent toward the center thereof so that the extension of the bent part intersects the axis of rotation of a rotary mirror rotatable at high speeds. The light beam produced in the optical device is directed to the rotary mirror and reflected thereby, focussed on the fore end part, transmitted through the optical fiber assemblage and emitted from the linear portion as a linear scanning beam in a sequence in conformity to the sequence of reception of light beam by the cylindrical portion. The object in the optical device is scanned with this linear scanning beam.

60 Claims, 14 Drawing Figures

COMBINATION OF CIRCULAR/STRAIGHT LINE LIGHT BEAM SCAN TRANSFORMING APPARATUS AND OPTICAL DEVICE AND METHOD OF FABRICATING CIRCULAR/STRAIGHT LINE TRANSFORMING DEVICE

BACKGROUND OF THE INVENTION

This invention relates to a system of a combined circular/straight line light beam scan transforming apparatus and optical device and to a method for the fabrication of a circular/straight line transforming device.

Heretofore, in writing in or reading out information by means of a high-speed printer or facsimile or in detecting contaminants or flaws on the surface of a printing plate or a sheet of paper or metal, the widespread practice has been to adopt the technique of high-speed scanning by use of a light beam, particularly, a laser beam.

For the purpose of high-speed scanning with laser beams, there has been adopted a method wherein a polygonal mirror is rotated at a high speed, a laser beam is directed to the mirror in rotation, and a reflected laser beam is used as the scanning beam. Since the polygonal mirror, by the nature of its function, is required to possess extremely strict mechanical and optical precision, it has been quite expensive. Also, since the locus of a bright spot of the focussed scanning beam traces on a curved surface, it is necessary to transform this locus of bright spot to a locus on a flat surface by passing the scanning beam through a special lens (hereinafter referred to as "f.$\theta$ lens"). This f.$\theta$ lens has also been very expensive. In the circumstances, a method which can effect the scanning by use of light beams without resort to such expensive polygonal mirror and f.$\theta$ lens has found popular acceptance.

To be specific, this conventional method utilizes a light-conducting element or a circular/straight line transforming device which comprises a circular/straight line transforming optical fiber assemblage having at one end thereof a cylindrical portion and at the other end a linear portion. On the cylindrical portion side, between a light-emitting element disposed on the central axis of the cylindrical portion and the contour of the cylindrical portion, there is provided a Z-shaped rotary fiber rod adapted to be freely rotated around the central axis of the cylindrical portion and composed of one end part disposed on the central axis, the other end part opposing the end surface of the cylindrical portion, and a connecting part connecting both the end parts. On the linear portion side, there is provided a photosensitive element opposing the end surface of the linear portion. The light beam issuing from the light-emitting element is admitted through one end of the Z-shaped rotary fiber in rotation and guided to the other end. The light beam which departs from the other end of the rotary fiber rod enters the cylindrical portion of the circular/straight line transforming optical fiber assemblage, propagates through this optical fiber assemblage and departs from the linear portion, thereby acting on the photosensitive element. Consequently, the circular scanning is transformed into the linear scanning. If, in this arrangement, a manuscript is substituted for the photosensitive element opposing the end surface of the linear portion and a light-receiving element is substituted for the light-emitting element on the central axis of the cylindrical portion, and the manuscript is illuminated, then the optical image of the manuscript can be transmitted to the light-receiving element along the reverse path, from the linear portion to the cylindrical portion, with the result that the linear scanning is transformed to the circular scanning.

In order for the aforementioned Z-shaped rotary fiber rod of flexible nature to be rotatably supported in position, it becomes necessary to retain the rotary fiber rod with a rigid wheel. For this purpose, the rotary fiber rod is retained with the rigid wheel in such a manner that the other end part and the connecting part of the rotary fiber rod are held in a wheel disk and the one end part of the rotary fiber rod is held in a central shaft of the wheel. The other end part of the rotary fiber, therefore, is allowed to scan the end surface of the cylindrical portion of the circular/straight line transforming device when the central shaft of the wheel journalled on a bearing is rotated with a suitable driving unit.

The diameter of the wheel, however, becomes quite large (in the order of 100 mm, for example), because the wheel by nature is required to possess a diameter equal to or greater than the diameter of the cylindrical portion. This means that the wheel inevitably possesses great mass. When the wheel of great mass is rotated at a high speed, it exerts a heavy load upon the central shaft of the wheel and the bearing supporting the shaft and does harm thereto. For this reason, in this conventional method, the rotation speed of the wheel should be limited to about 60 rotations per minute. (Refer to "Facsimile Guide '79-'80," page 62, published on May 10, 1979 by Nippon Noritsu Kyokai.)

SUMMARY OF THE INVENTION

An object of this invention is to provide a combination of an inexpensive, improved circular/straight line light beam scan transforming apparatus capable of high-speed scanning and an optical device making use of the transforming apparatus.

Another object of this invention is to provide a method for the fabrication of a circular/straight line transforming device for use in the aforementioned improved circular/straight line light beam scan transforming apparatus.

According to one general aspect of the invention, there is provided a combination of a circular/straight line light beam scan transforming apparatus and optical device, the optical device comprising:

means for producing a light beam capable of being varied in intensity by a modulation signal; and an object exposed to the scanning beam from the light beam scan apparatus, the light beam scan apparatus comprising:

focussing means for focussing the light beam from the light beam producing means;

rotary mirror means adapted to reflect the light beam from the focussing means;

means for rotating the mirror means at a high speed, and circular/straight line transforming optical fiber means which includes:

a cylindrical portion having a fore end part thereof bent toward the center thereof so that the extension of the bent part intersects the axis of rotation of the rotary mirror means, the reflected light beam being focussed on the fore end part; and a linear portion adapted to receive the light beam from the cylindrical portion and emit the light beam as a linear scanning beam in a sequence in conformity to the sequence of reception of light beam by the cylindrical portion.

According to another general aspect of the invention, there is provided a method for the fabrication of a circular/straight line transforming device comprising the steps of:

preparing a winding frame having a cylindrical main frame opened at opposite ends and a cylindrical sub-frame temporarily attached to one of the ends of the cylindrical main frame, the cylindrical sub-frame having the inner surface treated so as to repel an adhesive agent, for retaining thereon a linear portion;

winding an optical fiber round the wall of the winding frame toroidally until the wall is wholly covered with a single or multiple layer of the optical fiber;

establishing mutual adhesion between the optical fiber and the cylindrical sub-frame and between the adjacent optical fiber plies at the outer end part of the cylindrical sub-frame;

cutting the optical fiber along the inner-diametral, outer end corner of the cylindrical sub-frame;

removing from the cylindrical sub-frame the linear portion to which one cut end part of the optical fiber layer adheres;

drawing the linear portion out of the other open end of the cylindrical main frame;

subjecting the linear portion to a treatment for fixing the linear portion in a straightened state;

removing from said cylindrical main frame the cylindrical sub-frame to which the other cut end part of the optical fiber layer adheres;

and treating the cut end part bonded to the cylindrical sub-frame and the cut end part at the linear portion thereby providing therefor optically finished surfaces suitable for entrance and departure of light beam.

BRIEF DESCRIPTION OF THE DRAWINGS

FIGS. 4A through 8 are diagrammatic representations useful in explaining a method for fabrication of an optical fiber assemblage in a circular/straight line transforming device;

DESCRIPTION OF PREFERRED EMBODIMENT

First, the basic construction of this invention will be described with reference to FIG. 1 and FIG. 2. A circular/straight line light beam scan transforming apparatus 100 is provided with a circular/straight line transforming device 11 in the form of an optical fiber assemblage comprising a circular portion 12 and a linear portion 13, a motor (high-speed driver means) 14, a rotary mirror 15 having the center thereof coaxial with the central axis of the cylindrical portion 12 and driven at a high speed by the motor 14, and a focussing lens 17. An optical device 200 is provided with a light-emitting section comprising a light source 16 such as a laser diode and a well-known modulator circuit connected to the light source 16 for modulating the intensity of light beam issuing from the light source, and a light-receiving section comprising a rod lens array 22 adapted to receive the scanning light from the linear portion 13 of the circular/straight line transforming device 11 and an object 20 being movable in the direction of arrow 21 and subjected to the scanning with the scanning beam from the rod lens array.

The optical fiber assemblage 11 is composed of fibers of about 20 to 150 micron meters in diameter arranged in a single layer or in a multiple layer, the fiber being made of a plastic material or glass. As is clear from FIG. 2, the cylindrical portion 12 has a fore end part 12a bent toward the center of the cylinder so as to form a right angle relative to the axis of rotation of the rotary mirror 15, with the bent parts 12a of the individual optical fibers arranged circumferentially. This cylindrical portion 12 has a diameter of about 100 mm and the linear portion 13 has a length of about 300 mm, for example. The motor 14 is operated at a speed of 1350 rotations per second, for example, (refer to January 1971 issue of "NHK Monthly Technical Report," page 25). The rotary mirror 15 has an outer diameter (about 5 to 10 mm, for example) approximately equal to the diameter of the shaft of this motor 14. Because the diameter of the rotary mirror 15 is sufficiently small to lessen the load upon the motor 14, the motor 14 can be rotated at such a high speed.

Laser beam 18 emitted from the laser diode 16 disposed on the extension of the rotary shaft of the motor 14 is passed through the focussing lens 17 and then reflected by the rotary mirror 15 and focussed on the fore end part 12a of the cylindrical portion 12. As the rotary mirror 15 is rotated by the motor 14 at the high speed, the laser beam 18 sequentially scans the multiplicity of fore end parts 12a of the optical fibers arranged circumferentially. The diameter of the laser beam 18 which is focussed on the fore end part 12a is several of tens of microns, for example. The laser beam 18 focussed on the fore end part 12a comes into the interior of the cylindrical portion 12 efficiently and departs, in the form of a sequential scanning beam 19, from the fore end of the linear portion 13. This scanning beam 19 is diverged by an angle which is determined by the divergent angle of the circular/straight line transforming optical fiber assemblage 11, then passed through the rod lens array 22 and thereafter focussed on the object 20. The scanning beam 19, in the form of a spot having diameter of about 50 to 100 micron meters, linearly sweeps the object 20. When the output signal from the modulator circuit 16a is applied to the laser diode 16 to modulate the intensity of the laser beam 18, a desired image is drawn on the surface of the object 20 as the scanning beam 19 linearly scans the surface of the object 20 and the object 20 is moved (sub-scanned) at a fixed speed in the direction of arrow 21. The laser diode 16 may be substituted by a combination of some other suitable lasers such as, for example, a gas laser or solid laser and a modulator.

This invention has been described with respect to the embodiment aimed at the transformation of the circular scanning to the linear scanning.

Exact reversal of this transformation, i.e. transformation of the linear scanning to the circular scanning, can be accomplished by interchanging the light-emitting section and the light-receiving section. For example, a light-receiving element such as a PIN photo-diode is substituted for the combination of laser diode 16 and modulator circuit 16a and the surface of the object 20 is illuminated with suitable illumination means 20a. Thus, the light beam from the image on the surface of the object 20 is passed through the rod lens array 22, focussed on the fore end part of the linear portion 13 and guided into the interior of the linear portion 13. The image light beam thus directed into the linear portion 13 is emitted through the fore end part 12a of the cylindrical portion 12, reflected by the rotary mirror 15, and then focussed by the lens 17 on the light-receiving element which has taken the place of the laser diode 16. In short, the image light beam is received along a path which is an exact reversal of the path followed by the laser beam 18 during the transformation involving the use of the laser diode 16, and the received image light beam is utilized as the output of the light-receiving element. The construction illustrated in FIG. 1 may partly be modified as shown in FIG. 3. In the modified construction, the motor 14 and the laser diode 16 change places and a fore end part 12' of the cylindrical portion 12 is obliquely bent so that the extension of the bent part intersects, at a desirable angle other than right angles, the axis of rotation of the rotary mirror 15. All the remaining elements are identical with those of the preceding embodiment and, therefore, are denoted by the same symbols as used in FIG. 1 and FIG. 2. The angle of the rotary mirror 15, therefore, is selected so that the laser beam 18 will be focussed on the fore end part 12' of the cylindrical portion 12. The surface of rotary mirror 15 is inclined relative to the axis of rotation thereof by a smaller angle than that of the preceding embodiment and compatible with high-speed rotation of the motor 14, because the balance of the rotary shaft of the motor 14 is improved as compared with the preceding embodiment.

The circular/straight line transforming optical fiber assemblage 11 can be used to detect the rotating speed of the laser beam 18 when several optical fibers forming the linear portion 13 are chosen and combined with suitable optical sensors (such as, for example, photodiodes). This combination can be utilized as means for controlling the rotation of the motor 14.

As is clear from the foregoing description, the present embodiment contemplates inwardly bending the fore end part of the cylindrical portion of the circular/straight line transforming optical fiber assemblage and allowing the extension of the bent part to intersect the axis of rotation of the rotary mirror at a desirable angle and, therefore, can materialize a combination of a circular/straight line light beam scan transforming apparatus and optical device which is inexpensive by eliminating the expensive lens or the like and, provides highly efficient high-speed scanning.

Now, a method for the fabrication of the circular/straight line transforming device illustrated in FIG. 2 will be described with reference to FIG. 4A to FIG. 6. A winding frame 35 is prepared which comprises a cylindrical main frame 30 opened at opposite ends and having three oblong holes 31 formed in the peripheral wall in the axial direction at equally angular spacings, a cylindrical sub-frame 32 intended to form the cylindrical portion 12 (FIG. 2) of the circular/straight line transforming device 11, set screws 33 tightened through the inner walls of the respective oblong holes 31 into the cylindrical sub-frame 32, and a linear portion support plate 34 intended to form the linear portion 13 of the circular/straight line transforming device 11 (FIG. 2). On this winding frame 35, a layer 36 of optical fiber made of a plastic material or glass is wound round as indicated by dotted lines.

Figure 5:
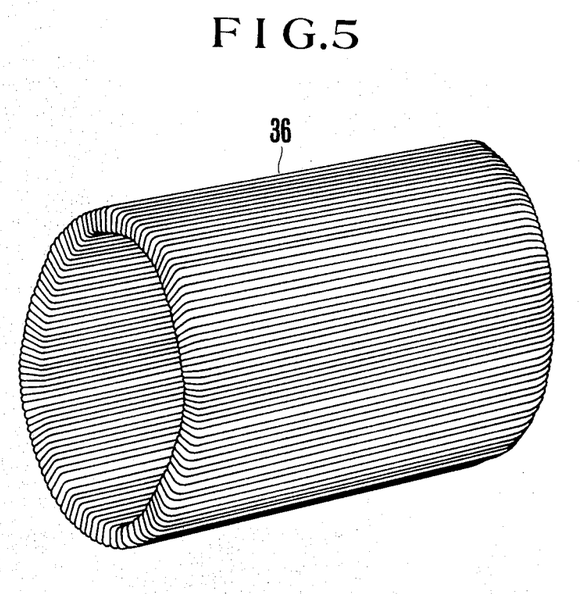

The cylindrical main frame 30 may be made of metal, plastic material or other substance. Since the cylindrical sub-frame 32 is destined to form a core for the cylindrical portion 12, it calls for high dimensional accuracy and abhors deformation. It is, therefore, desired to be made of metal. This cylindrical sub-frame 32 is set in position with one end face thereof brought into intimate contact with one end face of the main frame 30, and then temporarily fastened to the frame 30 with the three set screws 33 tightened from the respective oblong holes 31 into the wall of the frame 30. The linear portion support plate 34 is formed of either a tape of plastic or paper or a thin resilient sheet such as, for example, a resilient metal sheet, and is bonded to the inner surface of the cylindrical portion frame 32 with an adhesive agent of relatively weak bonding strength or with a paint or oil and fat. To form the optical fiber layer 36, one long continuous optical fiber is wound round the wall of the winding frame 35 toroidally from outside to inside and from inside to outside until the whole wall of the winding frame 35 is covered with a single layer or a multiple layer of the one fiber. FIG. 5 illustrates a finished toroidal winding. In this case, the work of winding the optical fiber can be greatly facilitated by using a coiling machine of the type adopted in winding a wire on cylindrical iron cores (toroidal coil) to produce a transformer or inductor, for example.

Figure 4A:
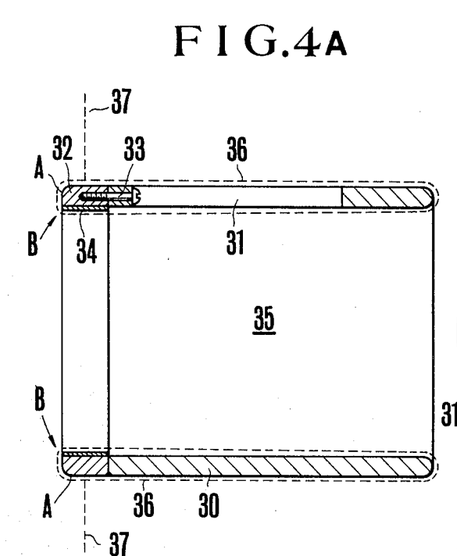

After the optical fiber layer 36 has been wound up on the winding frame 35, the left end part of the winding frame 35, to which the cylindrical sub-frame 32 has been temporarily attached, is immersed to the position indicated by dotted line 37 in FIG. 4A in an adhesive solution of high bonding strength and, after ample impregnation therewith, pulled up from the adhesive solution and dried. As a result, in an outer end part A of the cylindrical sub-frame 32, powerful adhesion is obtained between the optical fiber, the cylindrical sub-frame 32 and the linear portion support plate 34 and between the adjacent optical fiber plies. After the adhesive solution has been dried, fibers of the optical fiber layer 36 are cut with a cutter at the position indicated by arrow B, namely at the inner-diametral, outer end corner of the cylindrical sub-frame 32. After this cutting, the separate ends of the fiber of the optical fiber layer 36 remain bonded to the cylindrical portion frame 32 and the linear portion plate 34, respectively.

Figure 4B:
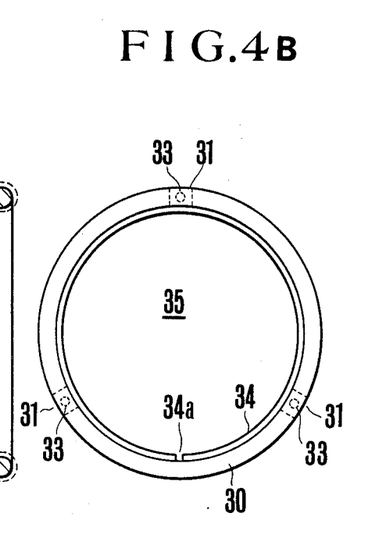
Figure 6:
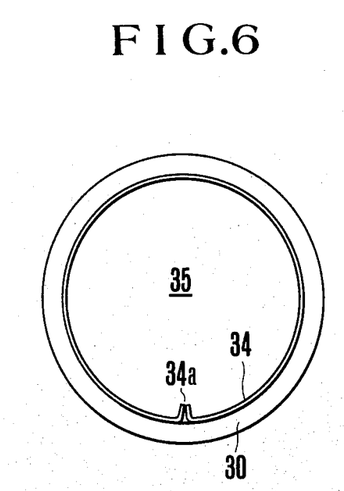

Then, the linear portion support plate 34 is peeled off the inner surface of the cylindrical sub-frame 32. Since the linear portion support plate 34 and the cylindrical sub-frame 32 have been joined to each other with an adhesive agent of low bonding strength, the adhesive solution of high bonding strength will not penetrate into their interface while the winding frame 35 is kept immersed in the adhesive solution. The linear portion support plate 34, therefore, can be readily peeled off from the opposite ends 34a thereof as illustrated in FIG. 4B. This separation can be further facilitated by having the opposite ends 34a of the linear portion support plate 34 bent inward in advance as illustrated in FIG. 6 since the bent tabs 34a can readily be pinched and pulled by fingers. After the linear portion support plate 34 has been peeled off as described above, it is pulled out of the opening on the opposite side, namely opposite to the cylindrical sub-frame 32. At the same time, the set screws 33 are removed to permit separation of the cylindrical sub-frame 32 from the main frame 30.

The linear portion support plate 34 and the cut ends of fibers of optical fiber layer 36 held fast to the plate 34 are interposed between two flat sheets such as of glass or metal and fastened thereto such as with an adhesive agent. The linear portion 13 of the circular/straight line transforming device 11 is completed by optically polishing the end face of the cut ends.

Figure 2:
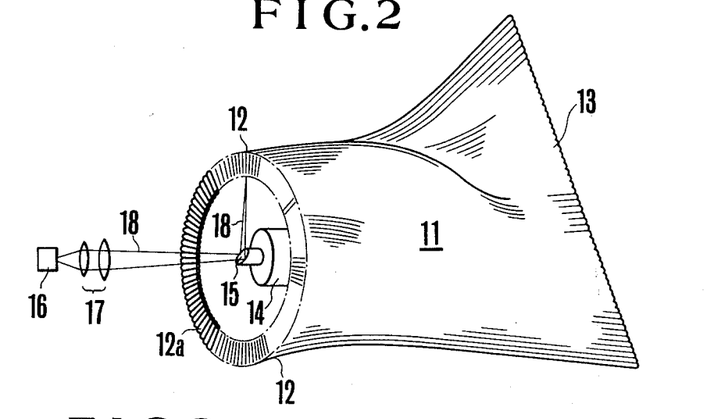
FIG. 2 is a perspective view of a circular/straight line light beam scan transforming apparatus used in the FIG. 1 system.
Figure 3:
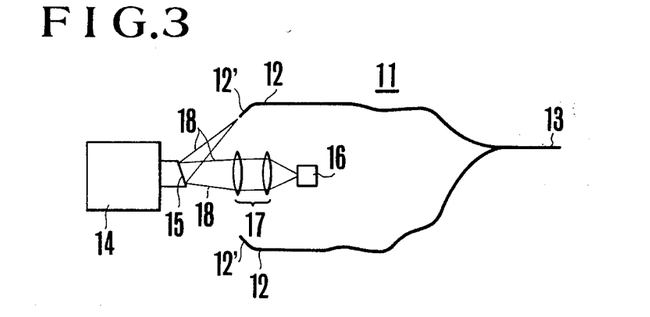
FIG. 3 is a schematic diagram showing a modification of the system shown in FIG. 1.

In the meantime, the cylindrical sub-frame 32 to which the remaining cut ends of fibers of the optical fiber layer 36 adhere is used in its unaltered form in the circular/straight line transforming device 11 as illustrated in FIG. 2, giving a definite shape to the cylindrical portion 12. The fore end part 12a of the cylindrical portion 12 in the circular/straight line transforming device is completed by optically polishing the cut ends of fibers of optical fiber layer 36 adhering to the cylindrical sub-frame 32.

Figure 7A:
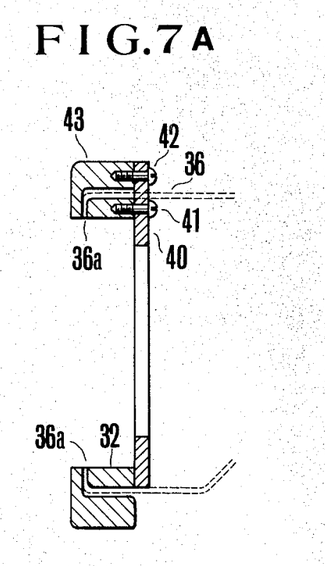
Figure 7B:
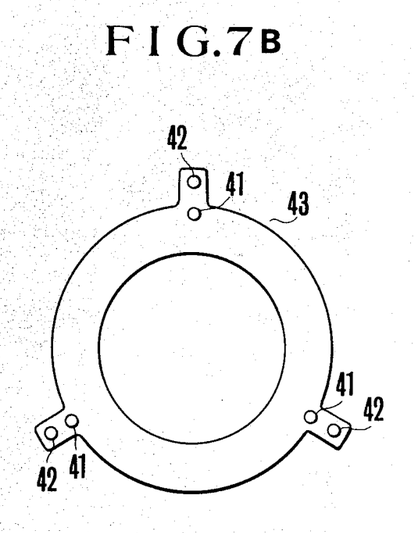

A modification illustrated in FIG. 7A and FIG. 7B may be adopted for protecting the optical fiber layer 36 joined fast to the cylindrical sub-frame 32. To be specific, in this modification, the cylindrical sub-frame 32 to which the optical fiber layer 36 is bonded is fixed to a base plate 40 with set screws 41 and the optical fiber layer 36 is mated with a retainer frame 43 which is fixed to the base plate 40 with set screws 42. In this case, more thorough adhesion of the optical fiber layer 36 can be obtained by filling an adhesive agent between the retainer frame 43 and the optical fiber layer 36. Thereafter, the cut ends 36a of fibers of the optical fiber layer 36 may preferably be polished. Not merely the cut ends of fibers but also the inner rim of cylindrical sub-frame 32 and the retainer frame 43 may be polished.

Figure 8:
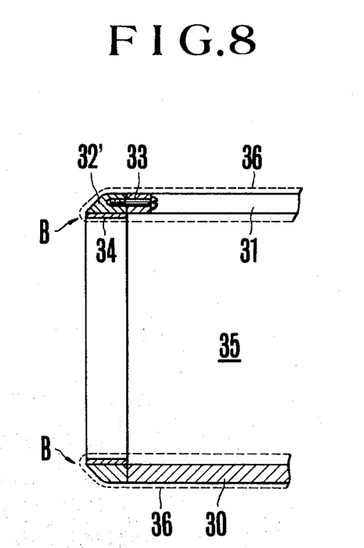

The fore end part 12' of the cylindrical portion 12 illustrated in the embodiment of FIG. 3 can be fabricated by using a cylindrical sub-frame 32' as illustrated in FIG. 8. To be specific, the outer peripheral surface of the cylindrical sub-frame 32' is obliquely cut off by an angle equalling the angle of inclination of the fore end part 12'. All the other elements are identical to those of the construction illustrated in FIG. 4A and FIG. 4B and, therefore, are denoted by the same symbols. It will be apparent that also in this alternation, a retainer frame 43 may be used which is in conformity to the contour of the cylindrical sub-frame 32'.

The adhesive agent to be used for fixing the optical fiber layer 36 in the constructions of FIGS. 4A and 4B and in FIG. 8 is desired to be of a type such that it will retain flexibility to some extent after it has been hardened. In the embodiments illustrated in these figures, the linear portion support plate 34 of a thin tape or thin metal sheet may be made of a substance such as fluorine resin (Teflon) to which the powerful adhesive agent used for fixing the optical fiber layer 36 is difficult to adhere, or the linear portion support plate 34 may be substituted by a paint or resin which is applied to the inner surface of the cylindrical sub-frame 32 for the purpose of preventing this inner surface from exposure to the powerful adhesive agent. When this measure is taken, the optical fibers alone are bonded together in the form of a plate after the optical fiber layer 36 treated with the powerful adhesive agent is cut in the part indicated by arrow B.

Now, a modified embodiment of the circular/straight line transforming device illustrated in FIG. 2 will be described with reference to FIG. 9. In this modification, the device comprises a first circular/straight line transforming optical fiber assemblage 11A having a curved portion 12A and a linear portion 13A, and a second circular/straight line transforming optical fiber assemblage 11B having a curved portion 12B and a linear portion 13B. The curved portions 12A and 12B constitute semicircular halves and are put together to form a cylindrical portion.

In the construction described above, the scanning beams 19 (FIG. 1) emitted from the linear portions 13A, 13B completes two rounds of scanning. In the construction of FIG. 9, the direction of the scanning beam 19 from the linear portion 13A and that from the linear portion 13B can be made to conform to each other by twisting the linear portion 13B through 180 degrees. Although the two linear portions 13A, 13B shown in FIG. 9 are separated from each other exaggeratedly for the sake of illustration, they are actually placed one over the other with a very small spacing. This spacing determines the space between the adjacent lines of the scanning beam 19. When the device is incorporated in a printer, for example, this space constitutes itself one of the essential factors for determining the resolving power.

Figure 9:
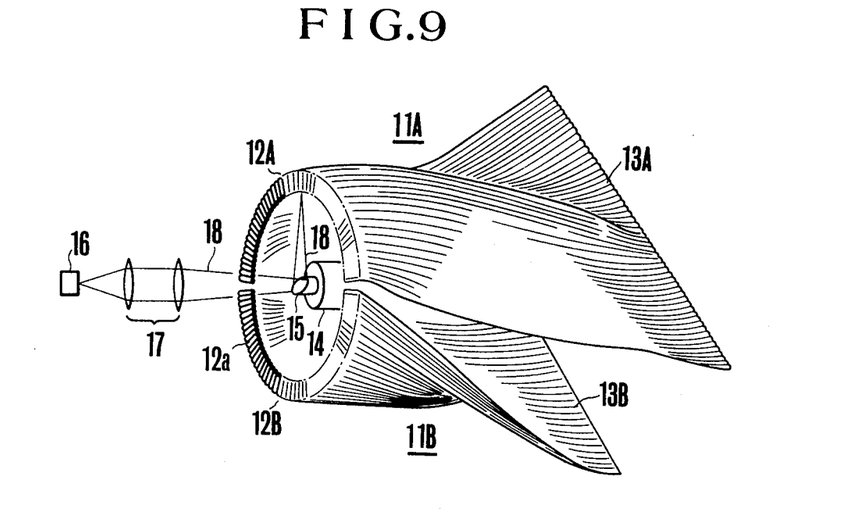
FIG. 9 is a perspective view of a modified circular/straight line light beam scan transforming apparatus.

It will be apparent that the device of the construction illustrated in FIG. 9 can be modified similarly to that illustrated in FIG. 3.

FIG. 9 illustrates an embodiment in which two circular/straight line transforming optical fiber assemblages 11A, 11B dividing one circle are used. It will be apparent that the number of rounds of scanning made by the scanning beam 19 can be further increased by increasing the number of divisions of the circle. In that case, however, it becomes necessary to increase the output of the laser diode 16 in proportion as the diameter of the cylindrical portion 12 is increased.

Now, a method for the fabrication of the modified transforming device as shown in FIG. 9 will be described. Since the procedure so far described with reference to FIG. 4A through FIG. 8 is applicable here in its virtually unaltered form, the following description will be limited to the part of the procedure which is specific to the fabrication of the transforming device of FIG. 9.

Unlike the method for the fabrication of the transforming device of FIG. 2, the linear portion plate 34 is equally divided by a number equal to or greater than the number of linear portions 13A, 13B . . . (two in the case of the embodiment of FIG. 9) actually involved, and the equally divided linear portion plates 34 are placed one over another, with thin spacers interposed therebetween. In the case of the two equally divided linear portion plates 34, one of them may be twisted by 180 degrees relative to the other. After the equally divided linear portion plates 34 have been placed one over another as described above, they are collectively interposed between two flat sheets of glass or metal and fixed thereto with an adhesive agent, for example. The linear portions 13A, 13B of the circular/straight line transforming devices 11A, 11B are completed by polishing the cut end face of fiber of the optical fiber layer 36 fixed to the linear portion plates 34.

On the other hand, the cylindrical sub-frame 32 to which the other cut end part of fibers of the optical fiber layer 36 is bonded is shared by the circular/straight line transforming devices 11A, 11B illustrated in FIG. 9 to support the cylindrical portions 12A, 12B in position. Finally, the fore end parts 12a of the cylindrical portions 12A, 12B of the circular/straight line transforming devices 11A, 11B are completed by polishing the cut end face of fibers of the optical fiber layer 36 fixed to the cylindrical sub-frame 32.

Figure 10:
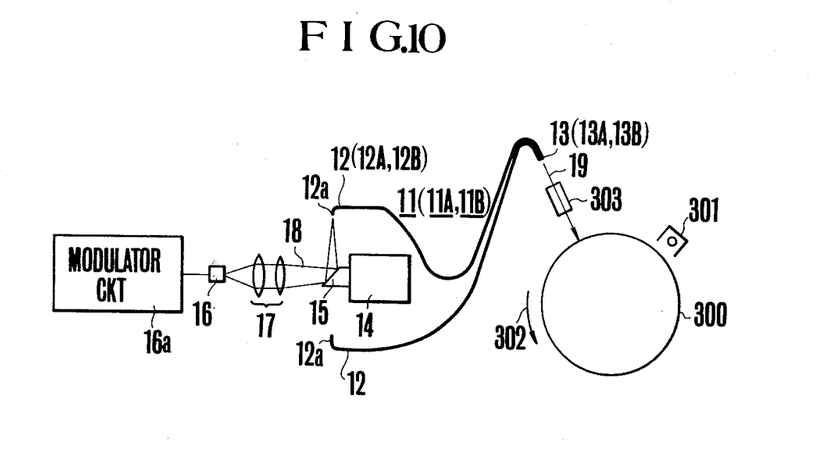
FIGS. 10 to 12 are schematic diagrams of various types of system embodying the invention.

Incidentally, the circular/straight line light beam scan transforming apparatus according to the present invention incorporating the transforming device 11, 11A or 11B can be combined with various types of optical device. FIG. 10 illustrates a case in which the scan transforming apparatus is combined with an electrostatic recording device to form a printer system capable of high-speed scanning.

Figure 1:
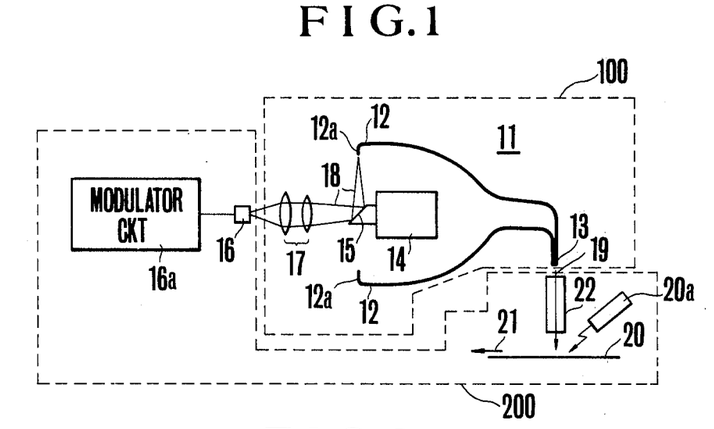
FIG. 1 is a shematic diagram showing a system according to the invention.

In FIG. 10, those parts which are identical to those of FIG. 1 and FIG. 9 are denoted by the same numeric symbols as used therein.

In the high-speed printer of this kind, a desired picture image is produced by scanning an electrostatically charged photosensitive element with a light beam, particularly a laser beam, spraying a toner (colored powder) over the scanned area and transferring the toner deposited to the element in accordance with the scanning pattern onto a sheet of plain paper. A photosensitive drum 300 and a charging unit 301 are similar to those used in the conventional electrostatic copying machine capable of electrostatic reproduction. Cooperatively associated with the photosensitive drum 300, are a toner unit, a transfer unit, a residual charge eliminator, etc., although they are not illustrated in the figure. Since the function and operation of these component units have been well known, a detailed description thereof will be omitted. By reference numeral 303 is denoted a rod lens array which may be eliminated, as desired.

During the operation of the system, scanning beam 19 of a spot diameter of about 50 to 100 micron meters which has passed through the rod lens array 303 impinges upon the peripheral surface of the photosensitive drum 300 and scans the surface linearly in the axial direction of the drum 300. In this arrangement, the intensity of the laser beam 18 issuing from the laser diode 16 is modulated by applying the signal from the modulator circuit 16a to the laser diode 16. Consequently, as the beam 19 linearly scans the surface of the photosensitive drum 300 and at the same time the photosensitive drum 300 is rotated at a fixed speed in the direction indicated by arrow 302 (sub-scanning), an electric charge in a pattern conforming to the desired picture image is retained on the surface of the photosensitive drum 300. Then, the desired picture image can be produced by spraying toner onto the electric charge and then transferring the deposited toner to a sheet of plain paper (not shown).

In copying the picture image by means of the photosensitive drum 300, the charging unit 301, etc., it is general that portions of the original exposed to the light beam appear as white areas and unexposed portions appear as black areas on the plain paper. Conversely, if desired, the exposed portions appear as black areas and the unexposed portions appear as white areas on the paper. In this case, the signal to be applied to the laser diode 16 must be inverted so as to give rise to a negative image. In most picture images, white portions preponderate over black portions. Accordingly, when a negative image is produced in which portions subject to highly intensive scanning beam 19 are blackened and portions subject to less intensive scanning beam 19 are whitened, power-up and prolonged life of the laser diode 16 can advantageously be attained.

Incidentally, the laser diode 16 as generally used emits a laser beam with a wavelength of the order of 850 nm. A photosensitive drum 300 in most applications of the conventional electrostatic copying machine, however, usually possesses sensitivity in the range of visible wavelengths, namely in the range of wavelengths ranging between 380 nm and 720 nm. For the present invention, therefore, it is desirable to use a photosensitive element which exhibits the highest sensitivity to the particular wavelength of the laser beam from the laser diode 16. In this respect, the photosensitive element is desired to be made of a material which exhibits high sensitivity to the range of longer wavelengths. Typical examples of the material include SeTe, CdS, CdSe, CdTe and $As_2Se_3$.

To increase the printing speed the motor 14 is rotated at high speeds, thereby increasing the rate of the scanning beam 19. When the scanning speed is increased, however, the amount of irradiation of the scanning beam 19 per unit area of the surface of the photosensitive drum 300 (intensity of beam $\times$ duration of irradiation) decreases in proportion as the duration of irradiation dwindles, with the result that formation of an excellent image of electric charge will no longer be obtained on the photosensitive drum 300. Again from this point of view, the photosensitive element to be used for the photosensitive drum 300 is desired to be made of a material which exhibits the highest sensitivity to the particular range of wavelengths possessed by the laser beam emitted from the laser diode 16.

Figure 11:
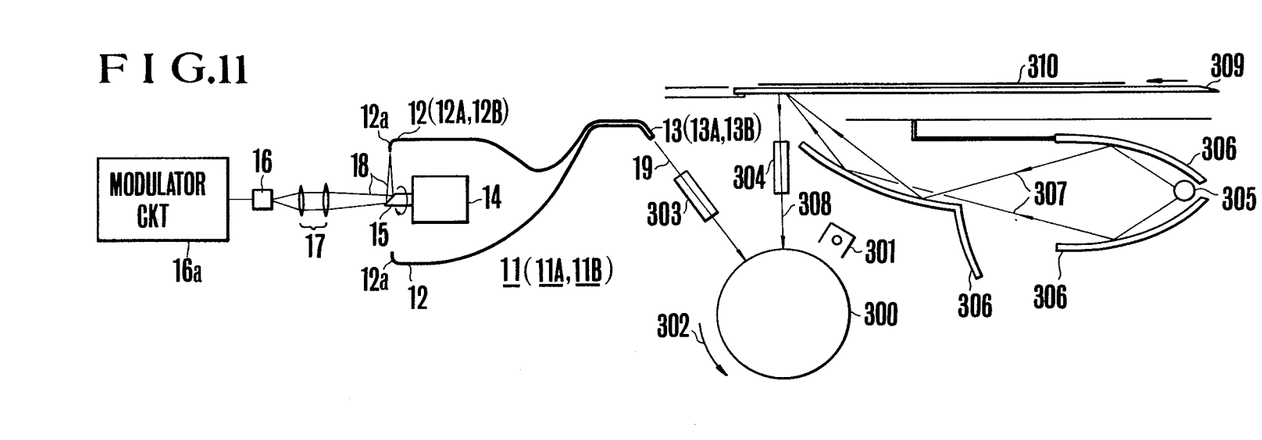

FIG. 11 illustrates another embodiment in which the circular/straight line light beam scan transforming apparatus of the present invention is combined with another optical device. Elements similar to those illustrated in FIG. 10 are denoted by the same numeric symbols, and a description of their functions and operations will be omitted.

In the figure, numeral 304 denotes a rod lens array, 305 a lamp, 306 a light-collecting mirror, 307 light beam for illuminating a manuscript 310 laid on a movable base 309, and 308 light of picture images from the manuscript 310. Cooperatively associated with the photosensitive drum 300, are a toner unit, a transfer unit, a residual charge eliminating unit, etc., through not illustrated. The conventional copying machine capable of PPC function (function of electrostatically copying picture images on plain paper) which is well known in the art is composed of the peripheral units plus the rod lens array 304, lamp 305, light-collecting mirror 306, movable base 309, etc. In operation, the peripheral surface of the photosensitive drum 300 is electrostatically charged with the charging unit 301, the manuscript 310 mounted on the movable base is illuminated with the light beam 307, the image light 308 is passed through the rod lens array 304 and irradiated on the surface of the photosensitive drum 300 to form thereon a latent electrostatic image, the latent electrostatic image is developed with the toner unit (not illustrated), and thereafter the developed image is transferred by means of the transfer unit (not illustrated) onto the plain paper fed from the paper feed unit (not illustrated).

Otherwise, as described with reference to FIG. 10, a desired image can be reproduced on the plain paper as the scanning beam 19 scans linearly the surface of the photosensitive drum 300 and at the same time the photosensitive drum 300 is rotated at a fixed speed in the direction of arrow 302 (sub-scanning).

In the embodiment of FIG. 11, when the image light 308 for the copying function and the scanning beam 19 for the printing function are simultaneously applied to the photosensitive drum 300, the image information included in the manuscript 310 and that included in the signal applied to the laser diode 16 can be reproduced and transferred at the same time. This operation of the system, therefore, proves highly convenient such as for editing, for example.

In this system, the copying machine of PPC function is not necessarily limited to the construction described above but may be modified in various ways. When the embodiment of FIG. 11 is operated as the copying machine possessing the PPC function, the image to be copied on the plain paper in conformity to the image on the manuscript is in a positive form. The photosensitive drum 300 can be charged so as to be adapted for production of a negative image. Thus, the system can operate, on the one hand, as the copying machine for the positive image and on the other hand as the printer for the negative image by inverting the signal applied to the laser diode 16.

As described above, the present embodiment realizes a simplified and inexpensive electrostatic recording system which combines the printing function and the PPC function.

Further, the electrostatic recording system has widespread applications by fulfiling the PPC not only in the output unit of computers but also in the facsimile system.

Figure 12:
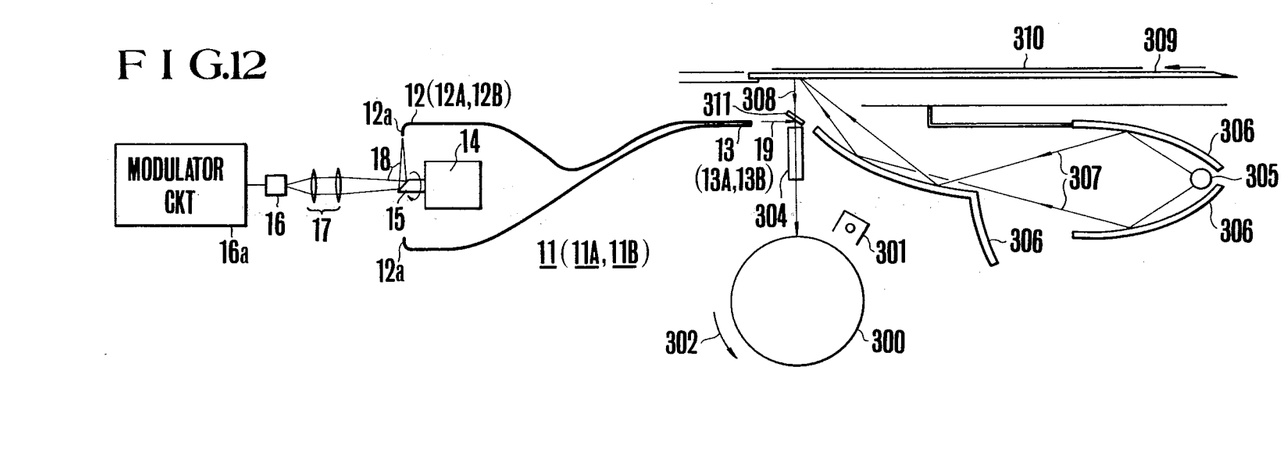

Now, yet another combination contemplated by the present invention will be described with reference to FIG. 12. In the figure, the parts identical with those indicated in FIG. 11 are denoted by the same numeric symbols and a description of their functions and operations will be omitted herein.

In the present embodiment, a selective mirror 311 is disposed where image light 308 and scanning beam 19 intersect with each other, and the selective mirror 311 functions to guide these light beams to the rod lens array 304. When the system operates as a copying machine, the peripheral surface of the photosensitive drum 300 is electrostatically charged with the charging unit 301, the manuscript 310 mounted on the movable base 309 is illuminated with illuminating light 307, image light 308 is transmitted through the selective mirror 311 and the rod lens array 304 to the photosensitive drum 300 thereby giving rise to a latent electrostatic image thereon, this latent electrostatic image is developed by means of the toner unit (not illustrated), and thereafter the developed image is transferred by the transfer unit (not illustrated) onto the plain paper fed from the paper feed unit (not illustrated).

In the meantime, scanning beam 19 is diverged to an angle determined by the opening angle of the optical fiber assemblage 11 (11A, 11B), reflected by the selective mirror 311, passed through the rod lens array 304, and finally focussed on the peripheral surface of the photosensitive drum 300, with the result that electric charge is retained in a pattern conforming to the desired picture image on the surface of the photosensitive drum 300. A copy of this picture image, therefore, is obtained by spraying the toner over the electric charge and transferring the picture image of toner onto the plain paper.

The selective mirror 311 is desired to be of a type such that it is pervious to the light of a wavelength less than 750 nm, for example, and impervious to the light of a wavelength more than 750 nm. Use of the selective mirror 311 satisfying this requirement proves to be highly advantageous when the system operates as the copying machine.

More particularly, illuminating light 307 issuing from the lamp 305 is converged by the light-collecting mirror 306 and then irradiated on the manuscript 310 on the movable base 309. The image light 308, the reflection of the illuminating light on the manuscript, may include the visible light and the near infrared light, depending on the characteristics of the lamp 305. When the image light penetrates through the selective mirror 311, however, the near infrared light having a wavelength of more than 750 nm is intercepted and the light permitted to go through the mirror is mostly of visible light. No matter how high the sensitivity exhibited by the photosensitive material to the long wavelength may be, the image of electric charge is produced mainly by the visible light on the photosensitive drum 300. Consequently, the selective mirror 311 selectively functions as a mirror for the scanning beam 19 and as a transparency for the visible ray portion of the image light 308 but as an opaque for the near infrared light. The photosensitive drum 300 made of a photosensitive material having high sensitivity to the near infrared light can thus be used, without facing any difficulties in the copying machine possessing the PPC function.

When the visible light with a wavelength of 720 nm, for example, is used as the laser beam 18, it is preferred that the selective mirror 311 be such that it does not pass but reflects the light with a wavelength of 720 nm and passes the light of other wavelength.

Otherwise, the selective mirror 311 may be of a type such that it only passes the light of a wavelength equalling the wavelength of the scanning beam 19 and it reflects the light of other wavelength. In this case, the photosensitive drum 300 and the rod lens array 304 are required to change their positions such that while the image light 308 issuing from the manuscript 310 is reflected by the selective mirror 311 and irradiated via the rod lens array 304 onto the photosensitive drum 300, the scanning beam 19 issuing from the linear portion 13 (13A, 13B) is passed through the selective mirror 311 and irradiated via the rod lens array 304 onto the photosensitive drum 300.

What is claimed is:

1. A combination of a circular/straight line light beam scan apparatus and optical device, said optical device comprising:
means for producing a light beam capable of being varied in intensity by a modulation signal; and
an object exposed to the scanning beam from said light beam scan apparatus,
said light beam scan apparatus comprising:
focussing means for focussing the light beam from said light beam producing means;
rotary mirror means adapted to reflect the light beam from said focussing means;
means for rotating said mirror means at a high speed, and
circular/straight line transforming optical fiber means which includes:
a cylindrical portion having a fore end part thereof bent toward the center thereof so that the extension of said bent part intersects the axis of rotation of said rotary mirror means, the reflected light beam being focussed on the fore end part; and
a linear portion adapted to receive said light beam from said cylindrical portion and emit said light beam as a linear scanning beam in a sequence in conformity to the sequence of reception of light beam by said cylindrical portion.

2. The combination according to claim 1, wherein said light beam producing means, focussing means and rotary mirror means are disposed on the central axial line of the cylindrical portion, and the axis of rotation of said rotary mirror mean and the extension of said fore end part perpendicularly intersect with each other.

3. The combination according to claim 1, wherein said light beam producing means, focussing means and rotary mirror means are disposed on the central axial line of the cylindrical portion, and the axis of rotation of said rotary mirror means and the extension of said fore end part obliquely intersect with each other.

4. The combination according to claim 1, wherein photo-sensors are disposed at desired output ends of said linear portion of the circular/linear line transforming optical fiber means.

5. The combination according to claim 4, wherein the output of the photo-sensor is utilized for the control of the rotation of the motor.

6. The combination according to claim 1, wherein a rod lens array is disposed between said object and said linear portion of the circular/straight line transforming optical fiber means, for guiding the scanning beam to said object.

7. A combination of a circule-line circular/straight line light beam scan transforming apparatus and optical device, said light apparatus comprising:
rotary mirror means adapted to reflect light beam;
circular/straight line transforming optical fiber means which comprises:
a linear portion adapted to guide light beam to a cylindrical portion, said cylindrical portion having the fore end part thereof bent toward the center thereof so that the extension of the bent part intersects the axis of rotation of said rotary mirror means, the light beam issuing from the fore end part being reflected by said rotary mirror means and directed to said light-receiving means; and
focussing means for focussing the reflected light from said rotary mirror means,
said optical device comprising:
light-receiving means incorporating therein a light-receiving element disposed on the axis of rotation of said rotary mirror means; and
guide means adapted to guide image light issuing from an illuminated object to said linear portion, whereby the image light introduced by said guide means to the linear portion is emitted to the position of said cylindrical portion corresponding to the position of said linear portion.

8. The combination according to claim 7, wherein said light-receiving means, focussing means and rotary mirror means are disposed on the central axial line of the cylindrical portion, and the axis of rotation of said rotary mirror means and the extension of said fore end part perpendicularly intersect with each other.

9. The combination according to claim 7, wherein said light-receiving means, focussing means and rotary mirror means are disposed on the central axial line of the cylindrical portion, and the axis of rotation of said rotary mirror means and the extension of said fore end part obliquely intersect with each other.

10. The combination according to any of claim 1, wherein the rotary mirror means comprises a motor and a mirror formed on the cut face of the rotary shaft of said motor.

11. The combination according to claim 10, wherein the mirror has a plane surface.

12. The combination according to claim 10, wherein the mirror has a diameter approximating the diameter of said rotary shaft.

13. The combination according to claim 10, wherein the guide means comprises a rod lens array.

14. A method for the fabrication of a circular/straight line transforming device comprising the steps of:
preparing a winding frame having a cylindrical main frame opened at opposite ends and a cylindrical sub-frame temporarily attached to one of the ends of the cylindrical main frame, the cylindrical sub-frame having the inner surface treated so as to repel an adhesive agent, for retaining thereon a linear portion;
winding an optical fiber round the wall of the winding frame toroidally until the wall is wholly covered with at least a single layer of the optical fiber;
establishing mutual adhesion between the optical fiber and the cylindrical sub-frame and between the adjacent optical fiber plies at the outer end part of the cylindrical sub-frame;
cutting the optical fiber along the inner-diametral, outer end corner of the cylindrical sub-frame;
removing from the cylindrical sub-frame the linear portion to which one cut end part of the optical fiber layer adheres;
drawing said linear portion out of the other open end of the cylindrical main frame;
subjecting the linear portion to a treatment for training the linear portion in a straightened state;
removing from said cylindrical main frame the cylindrical sub-frame to which the other cut end part of the optical fiber layer adheres; and
treating the cut end part bonded to the cylindrical sub-frame and the cut end part at the linear portion thereby providing therefor optically finished surfaces suitable for entrance and departure of light beam.

15. A method for the fabrication of a circular/straight line transforming device comprising the steps of:
preparing a winding frame having a cylindrical main frame opened at opposite ends, a cylindrical sub-frame temporarily attached to one of the ends of said main frame and a linear portion support plate temporarily joined to the inner surface of said cylindrical sub-frame;
winding an optical fiber round the wall of said winding frame toroidally until the wall is wholly covered with at least a single layer of the optical fiber;
establishing mutual adhesion between said optical fiber and said cylindrical sub-frame at the outer end part of said cylindrical sub-frame;
cutting said optical fiber along the outer boundary between said cylindrical sub-frame and said linear portion support plate;
peeling from said cylindrical sub-frame said linear portion support plate to which one cut end part of the optical fiber adheres;
drawing said linear portion support plate out of the other open end of said main frame;
subjecting said linear portion support plate to a treatment for training the linear portion support plate in a straightened state;
separating said cylindrical sub-frame from said main frame; and treating the other cut end part of said optical fiber adhering to said separated cylindrical sub-frame and said cut end part of the optical fiber adhering to said linear portion support plate, for providing thereto optically finished surfaces suitable for entrance and departure of light beam.

16. The method according to claim 14 or 15, wherein the cylindrical sub-frame is made of a metallic material.

17. The method according to claim 15, wherein the linear portion support plate is made of a thin sheet possessing resiliency.

18. The method according to claim 14, wherein the treatment intended for training the linear portion is a straightened state comprises fixing said linear portion of flat plates.

19. The method according to claim 14 or 15, wherein the sub-frame has an inclined peripheral face at the outer end thereof.

20. The method according to any of claims 15, which further comprises, after establishing mutual adhesion between the optical fiber and the cylindrical sub-frame and between the adjacent optical fiber plies at the outer end part of the cylindrical sub-frame and cutting the optical fiber along the inner-diametral, outer end corner of said cylindrical sub-frame, the steps of fixing to a base plate said cylindrical sub-frame to which the other cut end part of said optical fiber adheres, and retaining with a retainer frame the optical fiber adhering to said cylindrical sub-frame.

21. The method according to claim 20, wherein the interface between the retainer frame and the optical fiber adhering to the cylindrical sub-frame is filled with an adhesive agent.

22. The method according to claim 20 or 21, wherein after the optical fiber adhering to the cylindrical sub-frame is retained with the retainer frame, the cut end of said optical fiber is polished.

23. The method according to claim 15, wherein the treatment for training the linear portion support plate in a straightened state comprises fixing said linear portion support plate to flat plates.

24. A combination of a circular/straight line light beam scan transforming apparatus and optical device, said optical device comprising:
means for producing a light beam capable of being varied in intensity by a modulation signal; and
an object exposed to the scanning beam from said light beam scan apparatus,
said light beam apparatus comprising:
focussing means for focussing the light beam from said light beam producing means;
rotary mirror means adapted to reflect the light beam from said focussing means;
means for rotating said mirror means at a high speed, and
circular/straight line transforming optical fiber means which includes:
a cylindrical portion having a plurality of divisional curved portions, each curved portion having a fore end part thereof bent toward the center thereof so that the extension of said bent part intersects the axis of rotation of said rotary mirror means, the reflected light beam being focussed on the fore end part; and
a plurality of linear portions each adapted to receive said light beam from said curved portion and emit said light beam as a linear scanning beam in a sequence in conformity to the sequence of reception of light beam by curved portion.

25. The combination according to claim 24, wherein said light beam producing means, focussing means and rotary mirror means are disposed on the central axial line of the cylindrical portion, and the axis of rotation of said rotary mirror means and the extension of said fore end part perpendicularly intersect with each other.

26. The combination according to claim 24, wherein said light beam producing means, focussing means and rotary mirror means are disposed on the central axial line of the cylindrical portion, and the axis of rotation of said rotary mirror means and the extension of said fore end part obliquely intersect with each other.

27. The combination according to claim 24, wherein the rotary mirror means comprises a motor and a mirror formed on the cut face of the rotary shaft of said motor.

28. The combination according to claim 27, wherein the mirror has a plane surface.

29. The combination according to claim 27, wherein the mirror has a diameter approximating the diameter of said rotary shaft.

30. The combination according to claim 24, wherein said plurality of linear portions are overlapped with a slight spacing therebetween.

31. The combination according to claim 24, wherein photo-sensors are disposed at desired output ends of said linear portion of the circular/linear line transforming optical fiber means.

32. The combination according to claim 31, wherein the output of the photo-sensor is utilized for the control of the rotation of the motor.

33. The combination according to claim 24, wherein a rod lens array is disposed between said object and said linear portion of the circular/straight line transforming optical fiber means, for guiding the scanning beam to said object.

34. A method for the fabrication of a circular/straight line transforming device comprising the steps of:
preparing a winding frame having a cylindrical main frame opened at opposite ends and a cylindrical sub-frame temporarily attached to one of the ends of the cylindrical main frame, the cylindrical sub-frame having the inner surface treated so as to repel an adhesive agent, for retaining thereon a linear portion;
winding an optical fiber round the wall of the winding frame toroidally until the wall is wholly covered with at least a single layer of the optical fiber;
establishing mutual adhesion between the optical fiber and the cylindrical sub-frame and between the adjacent optical fiber plies at the outer end part of the cylindrical sub-frame;
cutting the optical fiber along the inner-diametral, outer end corner of the cylindrical sub-frame;
removing from the cylindrical sub-frame the linear portion to which one cut end part of the optical fiber layer adheres;
drawing said linear portion out of the other open end of the cylindrical main frame;
dividing said linear portion into a plurality of portions;
overlapping the plurality of divisional portions;
subjecting the divisional linear portions to a treatment for training them in a straightened state;
removing from said cylindrical main frame the cylindrical sub-frame to which the other cut end part of the optical fiber layer adheres; and
treating the cut end part bonded to the cylindrical sub-frame and the cut end part at the divisional linear portions thereby providing therefor optically finished surfaces suitable for entrance and departure of light beam.

35. A method for the fabrication of a circular/straight line transforming device comprising the steps of:
preparing a winding frame having a cylindrical main frame opened at opposite ends, a cylindrical sub-frame temporarily attached to one of the ends of said main frame and a linear portion support plate temporarily joined to the inner surface of said cylindrical sub-frame;
winding an optical fiber round the wall of said winding frame from toroidally until the wall is wholly covered with at least a single layer of the optical fiber;
establishing mutual adhesion between said optical fiber and said cylindrical sub-frame at the outer end part of said cylindrical sub-frame;
cutting said optical fiber along the outer boundary between said cylindrical sub-frame and said linear portion support plate;
peeling from said cylindrical sub-frame said linear portion support plate to which one cut end part of the optical fiber adheres;
drawing said linear portion support plate out of the other open end of said main frame;
dividing said linear portion support plate into a plurality of portions;
overlapping the plurality of divisional portions;
subjecting said divisional portions to a treatment for training them in a straightened state;
separating said cylindrical sub-frame from said main frame; and
treating the other cut end part of said optical fiber adhering to said separated cylindrical sub-frame and said cut end part of the optical fiber adhering to said divisional portions, for providing thereto optically finished surfaces suitable for entrance and departure of light beam.

36. The method according to claim 34 or 35, wherein the cylindrical sub-frame is made of a metallic material.

37. The method according to claim 35, wherein the linear portion support plate is made of a thin sheet possessing resiliency.

38. The method according to claim 35, wherein the treatment intended for training the divisional linear portions in a straightened state comprises overlapping said divisional linear portions with spacers interposed therebetween.

39. The method according to claim 34 or 35, wherein the sub-frame has an inclined peripheral face at the outer end thereof.

40. The method according to any of claims 35, which further comprises, after establishing mutual adhesion between the optical fiber and the cylindrical sub-frame and between the adjacent optical fiber plies at the outer end part of the cylindrical sub-frame and cutting the optical fiber along the inner-diametral, outer end corner of said cylindrical sub-frame, the steps of fixing to a base plate said cylindrical sub-frame to which the other cut end part of said optical fiber adheres, and retaining with a retainer frame the optical fiber adhering to said cylindrical sub-frame.

41. The method according to claim 40, wherein the interface between the retainer frame and the optical fiber adhering to the cylindrical sub-frame is filled with an adhesive agent.

42. The method according to claim 40 or 41, wherein after the optical fiber adhering to the cylindrical sub-frame is retained with the retainer frame, the cut end of said optical fiber is polished.

43. The method according to claim 34, wherein the divisional linear portions are overlapped with spacers interposed therebetween and clamped by upper and lower flat plates.

44. The method according to claim 35, wherein the treatment for training the divisional linear portion support plates in a straightened state comprises overlapping said divisional linear portion support plates with spacers interposed therebetween.

45. The method according to claim 35, wherein the divisional linear portion support plates are overlapped with spacers interposed therebetween and clamped by upper and lower flat plates.

46. The combination according to claim 1 or 23, wherein said object comprises copying means forming an electrostatic image corresponding to an optical pattern, for copying an image corresponding to the electrostatic image on plain paper.

47. The combination according to claim 46, wherein said copying means comprises a photosensitive drum, a charging unit, a toner unit, a transfer unit and a residual charge eliminator.

48. The combination according to claim 47, wherein said photosensitive drum has high sensitivity to long wavelengths.

49. The combination according to claim 47, wherein a rod lens array is disposed between said photosensitive drum and said linear portion of the circular/straight line transforming optical fiber means, for guiding the scanning beam to said copying means.

50. The combination according to claim 46, wherein characteristics of said copying means are changed for compatibility with negative images and the polarity of light beam from said light beam producing means is inverted.

51. The combination according to claim 1 or 23, wherein said object comprises copying means forming an electrostatic image corresponding to an optical pattern, for copying an image corresponding to the electrostatic image on plain paper, and means for scanning a manuscript to be copied with light beam, for producing an image light indicative of an optical pattern on the manuscript.

52. The combination according to claim 51, wherein said copying means comprises a photosensitive drum, charging unit, a toner unit, a transfer unit and a residual charge eliminator.

53. The combination to claim 52, wherein said photosensitive drum has high sensitivity to long wavelengths.

54. The combination according to claim 51, wherein the image light from said scanning means is applied to said copying means through a first rod lens array.

55. The combination according to claim 51, wherein the light beam from said circular/straight line transforming optical fiber means is applied to said copying means through a second lens array.

56. The combination according to claim 51, wherein characteristics of said copying means are changed for compatibility with negative images and the polarity of light beam from said light beam producing means is inverted.

57. The combination according to claim 51, wherein the image light from said scanning means and the light beam from said optical fiber means are applied to said copying means simultaneously.

58. The combination according to claim 54, which comprises a selective mirror for guiding the light beam from said circular/straight line transforming optical fiber means to said first rod lens array.

59. The combination according to claim 58, wherein the selective mirror acts as a transparency for the visible ray portion of the image light and as an opaque for the light beam.

60. The combination according to claim 58, wherein the selective mirror acts as an opaque for the visible ray portion of the image light and as a transparency for the light beam.

* * * * *

UNITED STATES PATENT AND TRADEMARK OFFICE
CERTIFICATE OF CORRECTION

PATENT NO. : 4,352,550
DATED : 10/5/82
INVENTOR(S) : Kozo Uchida

It is certified that error appears in the above-identified patent and that said Letters Patent are hereby corrected as shown below:

| COLUMN | LINE | DESCRIPTION |
|---|---|---|
| 15 | 13 | Delete "is", insert --in--. |
| 15 | 14 | Delete "of", insert --to--. |
| 18 | 51 | After the word "combination", insert --according--. |

Signed and Sealed this

Twenty-fifth Day of September 1984

[SEAL]

Attest:

GERALD J. MOSSINGHOFF

Attesting Officer   Commissioner of Patents and Trademarks